(12) United States Patent
Tseng et al.

(10) Patent No.: US 7,724,347 B2
(45) Date of Patent: May 25, 2010

(54) TUNABLE LIQUID CRYSTAL LENS MODULE

(75) Inventors: Ling-Yuan Tseng, Saratoga, CA (US); Cheng-Hsing Liao, Hsinchu (TW); Atsuo Kusada, Mahwah, NJ (US)

(73) Assignee: Tunable Optix Corporation, Hsinchu (TW)

( * ) Notice: Subject to any disclaimer, the term of this patent is extended or adjusted under 35 U.S.C. 154(b) by 0 days.

(21) Appl. No.: 11/850,248

(22) Filed: Sep. 5, 2007

(65) Prior Publication Data
US 2008/0088756 A1 Apr. 17, 2008

Related U.S. Application Data (60) Provisional application No. 60/824,473, filed on Sep. 5, 2006, provisional application No. 60/910,886, filed on Apr. 10, 2007, provisional application No. 60/939,396, filed on May 22, 2007, provisional application No. 60/942,310, filed on Jun. 6, 2007, provisional application No. 60/946,451, filed on Jun. 27, 2007, provisional application No. 60/948,570, filed on Jul. 9, 2007.

(51) Int. Cl.
G02F 1/13 (2006.01)
(52) U.S. Cl. .................. 349/200; 359/721
(58) Field of Classification Search ............ 349/1, 349/5, 56, 84, 86, 193, 200
See application file for complete search history.

(56) References Cited

U.S. PATENT DOCUMENTS

| | | | | |
|---|---|---|---|---|
| 5,544,268 A * | 8/1996 | Bischel et al. | ............ | 385/4 |
| 5,630,004 A * | 5/1997 | Deacon et al. | ............ | 385/129 |
| 5,664,032 A * | 9/1997 | Bischel et al. | ............ | 385/4 |
| 5,724,463 A * | 3/1998 | Deacon et al. | ............ | 385/27 |
| 5,732,177 A * | 3/1998 | Deacon et al. | ............ | 385/122 |
| 5,852,688 A * | 12/1998 | Brinkman et al. | ............ | 385/16 |
| 5,867,238 A | 2/1999 | Miller et al. | | |
| 5,887,089 A * | 3/1999 | Deacon et al. | ............ | 385/22 |
| 5,911,018 A * | 6/1999 | Bischel et al. | ............ | 385/16 |
| 5,912,997 A * | 6/1999 | Bischel et al. | ............ | 385/15 |
| 5,976,405 A | 11/1999 | Clikeman et al. | | |
| 5,978,524 A * | 11/1999 | Bischel et al. | ............ | 385/4 |
| 6,002,383 A | 12/1999 | Shimada et al. | | |
| 6,078,704 A * | 6/2000 | Bischel et al. | ............ | 385/4 |
| 6,118,908 A * | 9/2000 | Bischel et al. | ............ | 385/14 |
| 6,141,465 A * | 10/2000 | Bischel et al. | ............ | 385/4 |
| 6,167,169 A * | 12/2000 | Brinkman et al. | ............ | 385/4 |
| 6,218,679 B1 * | 4/2001 | Takahara et al. | ............ | 257/59 |
| 6,271,898 B1 | 8/2001 | Clikeman et al. | | |
| 6,393,172 B1 * | 5/2002 | Brinkman et al. | ............ | 385/16 |
| 6,452,650 B1 | 9/2002 | Nakao et al. | | |
| 6,464,692 B1 * | 10/2002 | Ruiz et al. | ............ | 606/5 |

(Continued)

Primary Examiner—Frank G Font
Assistant Examiner—Peter Radkowski
(74) Attorney, Agent, or Firm—Winston Hsu (57) ABSTRACT

An electrically controlled liquid crystal zoom lens system for a camera or the like is set to a desired zoom by an operator. The desired zoom signal is provided to an image signal processor which also receives the output of an image sensor at the output of the lens. The process generates a control signal for a power supply which adjusts the voltage between electrodes sandwiching the liquid crystal module. By rapid, iterative adjustment the actual zoom is brought to the desired zoom level. The liquid crystal module is combined in series with conventional lenses which may be integrated with the liquid crystal.

15 Claims, 6 Drawing Sheets

U.S. PATENT DOCUMENTS

| | | |
|---|---|---|
| 6,476,887 B1 | 11/2002 | Sekine et al. |
| 6,497,928 B1 | 12/2002 | Sato et al. |
| 6,522,794 B1 * | 2/2003 | Bischel et al. ............... 385/4 |
| 6,665,042 B1 | 12/2003 | Marshall et al. |
| 6,770,068 B2 * | 8/2004 | Ruiz et al. ................... 606/5 |
| 6,815,016 B2 | 11/2004 | Kyu et al. |
| 6,864,931 B1 | 3/2005 | Kumar at al. |
| 6,864,951 B1 * | 3/2005 | Ren et al. ................. 349/200 |
| 6,897,936 B1 | 5/2005 | Li et al. |
| 6,898,021 B1 | 5/2005 | Tang |
| 7,029,728 B2 | 4/2006 | Dunn et al. |
| 7,034,907 B2 | 4/2006 | West et al. |
| 7,038,743 B2 | 5/2006 | Komitov et al. |
| 7,038,754 B2 | 5/2006 | Hirakata et al. |
| 7,042,549 B1 * | 5/2006 | Ren et al. ................. 349/200 |
| 7,079,203 B1 | 7/2006 | Huang et al. |
| 7,102,706 B2 | 9/2006 | Kim et al. |
| 7,312,917 B2 * | 12/2007 | Jacob ....................... 359/319 |
| 7,327,434 B1 * | 2/2008 | Ren et al. ................. 349/200 |
| 7,339,746 B2 | 3/2008 | Kim et al. |
| 7,369,327 B1 | 5/2008 | Nishioka et al. |
| 2005/0225877 A1 * | 10/2005 | Tang ......................... 359/721 |
| 2006/0164593 A1 * | 7/2006 | Peyghambarian et al. ... 349/200 |
| 2006/0187430 A1 * | 8/2006 | Dodoc et al. ................ 355/53 |
| 2007/0201138 A1 * | 8/2007 | Lo ............................. 359/666 |
| 2008/0030872 A1 | 2/2008 | Nishioka et al. |
| 2008/0192359 A1 * | 8/2008 | Sohmer et al. ............ 359/649 |
| 2008/0252556 A1 * | 10/2008 | Tseng et al. .................. 345/6 |

* cited by examiner

TUNABLE LIQUID CRYSTAL LENS MODULE

CROSS-REFERENCE TO RELATED APPLICATIONS

This application claims priority of U.S. Provisional Patent Applications Ser. Nos. 60/824,473 filed Sep. 5, 2006; 60/910,886 filed Apr. 10, 2007; 60/939,396 filed May 22, 2007; 60/942,310 filed Jun. 6, 2007; 60/946,451 filed Jun. 27, 2007; and 60/948,570 filed Jul. 9, 2007, to Taiwanese Patent Application Nos. 95221706 filed Dec. 9, 2006; 95220173, filed Nov. 16, 2006; 95222454, filed Dec. 20, 2006 and to Chinese Patent Application Nos. 2006/20175165.3 filed Dec. 31, 2006; 2006/20175163.4 filed Dec. 31, 2006; and 2006/20175166.8 filed Dec. 31, 2006 which are incorporated herein by reference.

FIELD OF THE INVENTION

This invention relates to liquid crystal lenses and more particularly to tunable liquid crystal lenses in the form of modules that may be tuned by the application of electrical fields to obtain zoom functions without any mechanical motion.

BACKGROUND OF THE INVENTION

Zoom lenses employed in conventional cameras employ multiple lenses which must be moved relative to one another to obtain variation and magnification and for focusing. Typically a small electric motor is used to drive the lenses. It would be desirable to incorporate zoom lenses on small portable cameras, such as the type used with cellular phones, but the physical limitations of the small devices make the provision of a conventional zoom lens impossible. A better solution to the problem would be to provide a tunable liquid crystal lens. These lenses comprise a liquid crystal layer sandwiched between a pair of electrodes. By applying different voltages on the electrodes, the index of refraction of the lens may be varied to obtain different focal lengths.

Such liquid crystal lenses present attractive features for use with small portable cameras such as cell phone cameras. They have been under development for over 25 years and many advantageous structures have been proposed including non-homogeneous nanoscale polymer dispersed LC droplets composing the LC layer. By exposing the LC layer to ultraviolet light, a selected lens pattern will be permanently created. The applied voltage on the electrodes will modify the refractive index profile of the lens. Ultraviolet treatment of the liquid crystal to form a desired pattern which may be varied by applying different voltage is also mentioned in "Cholesterol-oleate-doped polymer-dispersed liquid-crystal voltage-controlled ring projector", by Olivares-Pérez et al., Optics Letters Vol. 27, No. 12, pages 1022-1024, Jun. 15, 2002.

SUMMARY OF THE INVENTION

The present invention is directed toward improvements in electrically tunable liquid crystal lens structures and to a zoom lens control system employing liquid crystal lenses.

A preferred embodiment of the present invention integrates conventional lenses either formed of glass or plastic with a liquid crystal lens into a zoom module. The present invention employs a liquid crystal lens as the lens core which will offer the same function as conventional lenses but offer the refractive index variation based on voltage changes. A conventional spherical or aspherical lens made of glass or plastic is then attached to the liquid crystal lens so that light passes both through the conventional lens and the liquid crystal lens. The conventional lenses may be attached to either side of the liquid crystal lens or to both sides so as to sandwich the liquid crystal lens between the conventional lenses. This is preferably achieved through adhering the conventional lens to the liquid crystal lens by using an adhesive with a high transparency.

Alternatively, the ITO substrate for the liquid crystal lens and the conventional lens to be joined to the liquid crystal lens may be formed in a single mold to provide one half of the device. After the half device is fabricated, the ITO layer may be coated and followed by liquid crystal alignment layer coating. The same process will be used for the second lens half and the two halves may then be laminated by dispensing sealant material around the active image area to act as a wall but with a central opening allowing for the filling with liquid crystal material. In a preferred embodiment a sandwich structure will be used to enhance the performance of the LC lens. Two LC lenses will be stacked together in an orthogonal orientation to one another to avoid the light decrease resulting from polarization. Thus, the light intensity will be double that if only one lens cell is used.

Once the lens is fabricated, an LC treatment process is followed. The first step is to get all necessary optical parameters of the basic LC lens: the refractive index, the voltage applied, the incident light frequency involved, the temperature, etc. The data collection will involve measurements at a number of points crossing the active image area.

If a predefined lens pattern is required, then a gray mask will be used. The gray mask will perform as a lens pattern forming tool. A laser beam or ultraviolet light is applied to the LC cell and the nonuniform distribution of the gray mask pattern yields different polymer structure formations in the liquid crystal material. With simultaneous voltages applied, the lens formation will also be a function of the applied voltage.

The final assembly will incorporate at least one conventional lens bonded to the ITO layer, or two lenses bonded to both ITO layers on opposite sides of the LC lens in order to sandwich the lens. The conventional lenses may be concave, convex or some combination thereof.

The present invention further contemplates a system comprising a series of negative and/or positive liquid crystal lenses with the refractive index of each liquid crystal controlled by separate voltages supplied by a driver circuit. The driver circuit is in turn controlled by an image sensor processor which receives the output of an image sensor for the output of the lens system. The image sensor could be a CMOS sensor or a CCD sensor. It captures the image and feeds it back to the image sensor processor. The image sensor processor, operating through an algorithm, adjusts the voltage of the driving circuit. The operator controls the zoom power by an external dial which provides its signal to the image sensor processor. The indicated zoom is compared with the image recorded on the sensor and the voltages are again adjusted. After a few iterations the image display is satisfied so that the user can take the picture.

BRIEF DESCRIPTION OF THE DRAWINGS

Other objects, advantages and applications of the present invention will be made apparent by the following detailed description of several preferred embodiments of the invention. The description makes reference to the accompanying drawings in which.

DETAILED DESCRIPTION OF THE PREFERRED EMBODIMENTS

Figure 1:
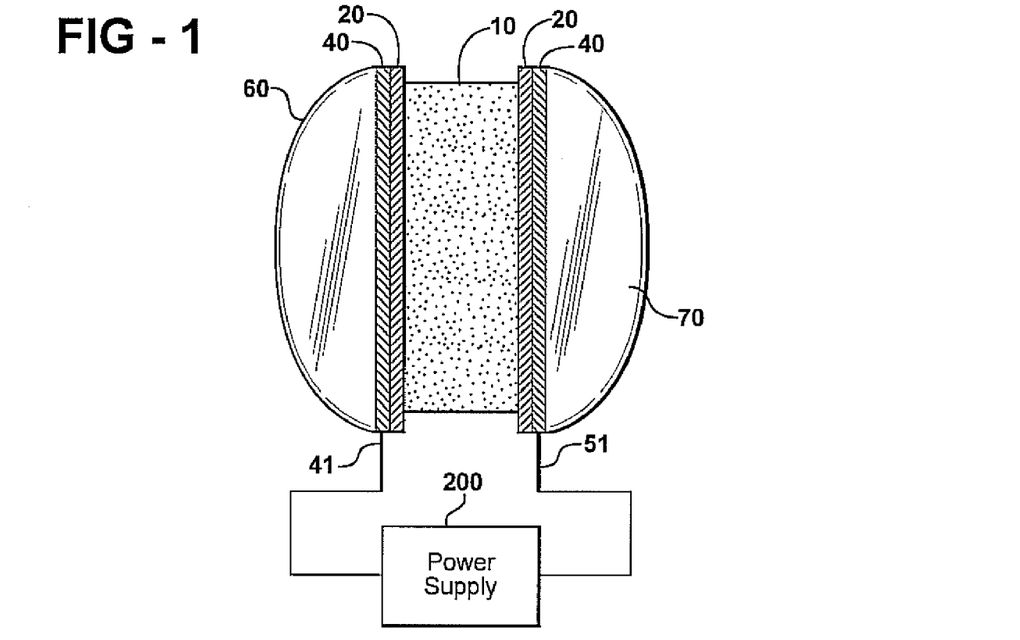
FIG. 1 is a side view of a liquid crystal module integrated with a pair of sandwiching conventional lenses, with the refractive index of the liquid crystal being controlled by a power supply, in accordance with a first preferred embodiment of the invention.

A basic module incorporating a liquid crystal lens integrated with a pair of sandwiching conventional lenses, formed of either glass or plastic, is illustrated in FIG. 1.

A conventional liquid crystal layer 10 is sandwiched between a pair of alignment layers 20. The alignment layer is preferably an organic material such as polyimide or a nonorganic material such as silicon dioxide. In a preferred embodiment of our invention the liquid crystal material is conventional polymer network liquid crystal. By mixing monomers with the liquid crystal compounds, after UV or laser treatment, as will subsequently be described, it will form the equivalents to various lenses such as a positive lens, a negative lens, or an aspheric shape. The outer sides of the alignment layer are sandwiched between two planar ITO electrode layers 40. Each of the electrode layers is connected to one terminal of a power supply 200 by leads 41 and 51. By varying the voltage applied to the electrode layers from the power supply, the refractive index of the liquid crystal layer 10 may be varied. An input conventional lens 60, which is shown as a plano-convex lens, is attached to the outer side of one of the electrodes 40 and a similar conventional lens 70, which could be of a different shape, is sandwiched to the outer side of the electrode 40. Thus light passing through the module passes through one conventional lens, the liquid crystal layer and then the output conventional lens. By adjusting the voltage of the power supply 200 and thus the refractive index of the LC module, the refractive index of the entire assembly may be varied without any mechanical adjustments.

Figure 2:
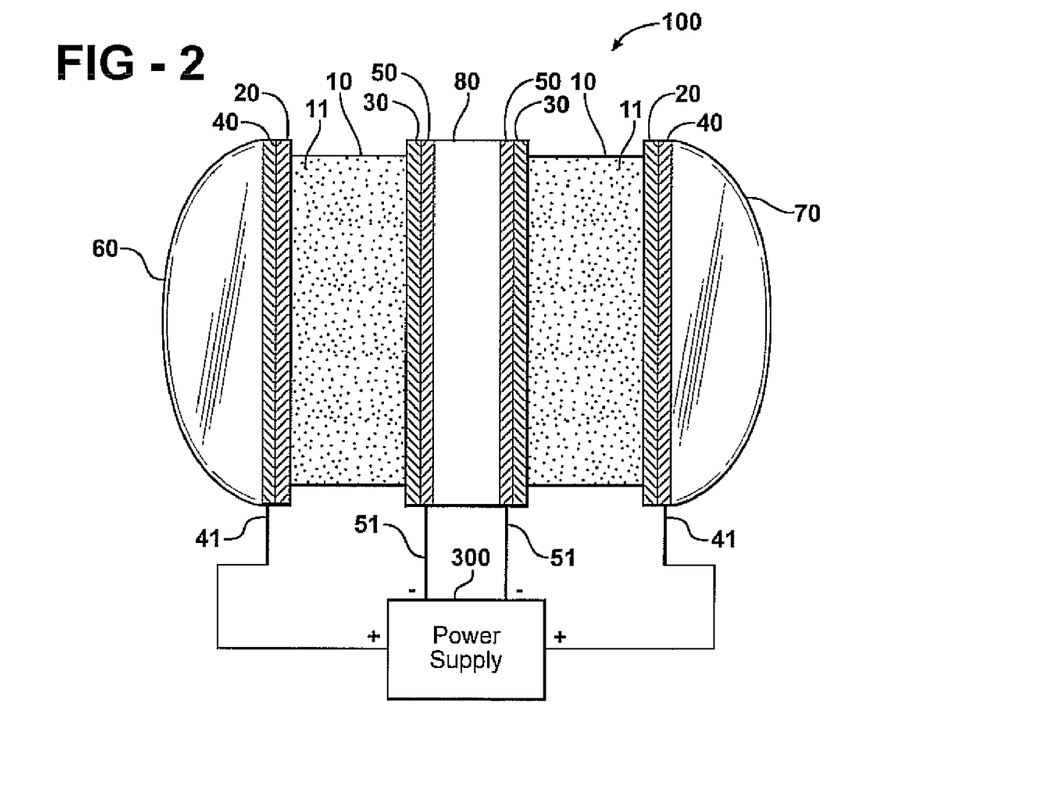
FIG. 2 is a side view of an alternative embodiment of the invention which employs a series pair of two liquid crystals with conventional lenses sandwiching the outer sides of the module.

FIG. 2 illustrates an alternative module employing two LC lens 11 integrated into a single module with a transparent spacer 80 between the two. A power supply 300 adjusts the voltages across electrodes sandwiching the LC lenses separately.

Figure 7:
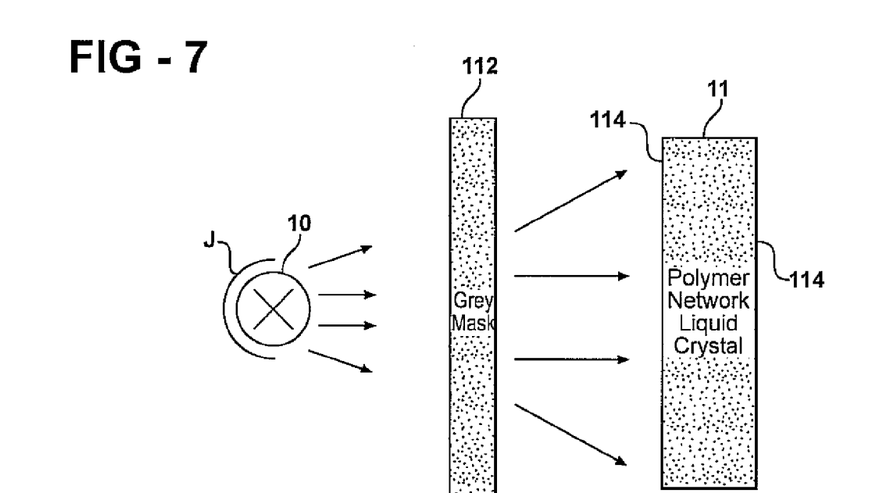
FIG. 7 is an illustration showing the manner of use of an ultraviolet light source and a gray mask to form a desired lens structure in a polymer network liquid crystal lens.

Referring now to FIG. 7, the manner of treatment of the LC layer to obtain a desired lens configuration in the layer is addressed. A raw polymer network liquid crystal capsule 11 is exposed to an ultraviolet light source 110 through a mask 112 of varying transparency so that the light intensity falling upon the liquid crystal device 11 varies as a function of the transparency of the path that the light beam takes through the mask 112. In the case of FIG. 7 the dotted lines 114 indicate tie effective contours of the resulting liquid crystal display, in the form of a negative lens. The refractive index of the lens can be modulated by voltage applied to a module incorporating the liquid crystal, in the manner noted in the system diagrams.

Figure 3:
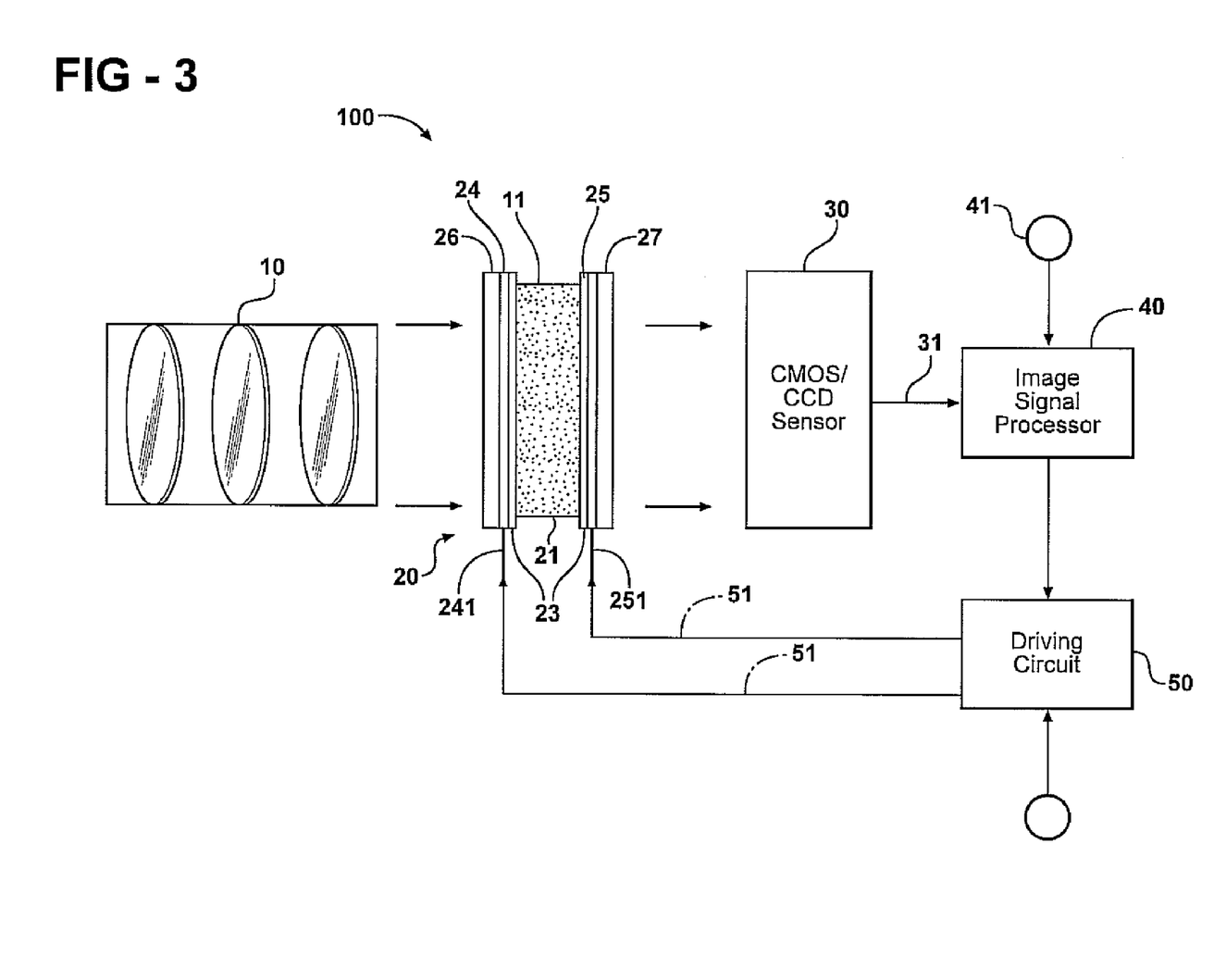
FIG. 3 is a schematic diagram of a system employing an LC lens module feeding its output to an optical sensor which in turn feeds an image signal processor that controls the voltage drive circuit in order to achieve a desired zoom.

After formation of a module of the type illustrated in FIG. 1 or 2 and fixing of the LC layer using the method of FIG. 7, the assembly may be employed in the preferred embodiment of the system of the present invention. FIG. 3 illustrates a module, generally indicated at 100, comprising an LC layer 11 contacting two sandwiching electrodes 24 and 25, interfaced with alignment layers 22 and 23, all sandwiched between glass substrates 26 and 27. A lens module 10, which may incorporate any desirable series group of conventional lenses, channels light from the image through the LC module 100. The output is detected by a sensor 30 which may be CMOS or CCD. The output is provided to image signal processor 40 which analyzes the image and based on an algorithm provides signals to an electrode driving circuit 50 which powers the two electrodes to modify the refractive index of the LC unit 100. The image signal processor 40 also receives a desired zoom signal from an operator controlled switch 41. The image signal processor 40 analyzes the outputs of the image sensor 30 to determine if the desired zoom level has been attained and typically modifies the signal to the driving circuit to vary the refractive index of the LC 100. This is repeated through a process of successive approximations to quickly achieve the appropriate refractive index for the desired zoom in a fraction of a second. The operator then depresses a button to expose the sensor 30 to the final image.

Figure 4:
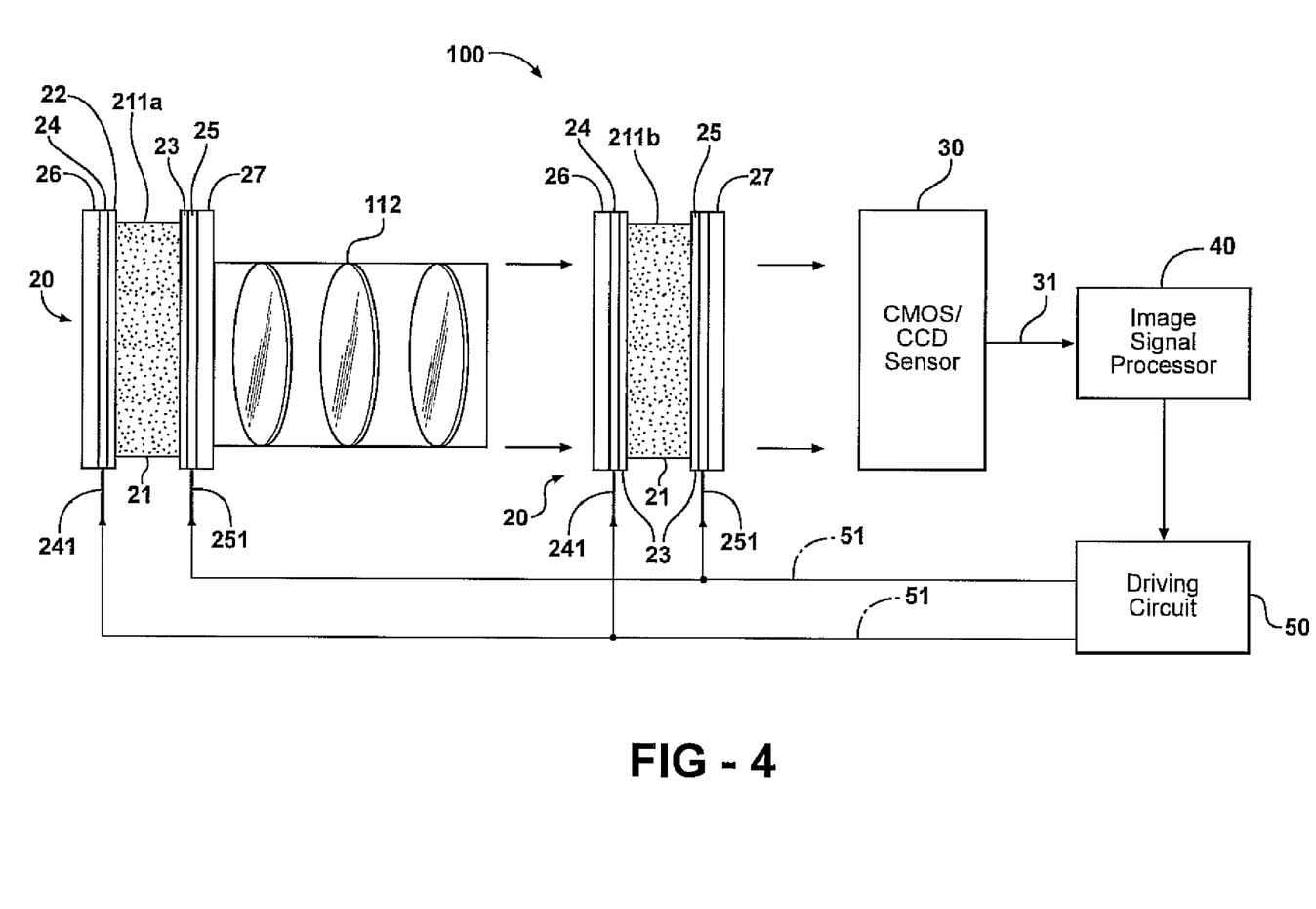
FIG. 4 is a schematic diagram of a similar system employing a pair of liquid crystal lenses, one arrayed in front of a conventional lens module and the other at the other at the output of the conventional lens module, with the refractive index of both LC lenses controlled by a system similar to that of FIG. 3.

FIG. 4 discloses a variation of the circuit of FIG. 3 wherein the lens module 112 operates between a pair of LC modules 211a which precedes the lens module and 211b which follows the lens module. Again, the image signal after passing through the series of the LC 211a, the lens module 112 and the LC 211b is recorded on the image sensor 30 and its output provided to the image sensor processor 40 which controls the driver circuit 50 to modify the refractive index of both of the LCs in order to home in on a zoom signal entered by the operator.

Figure 5:
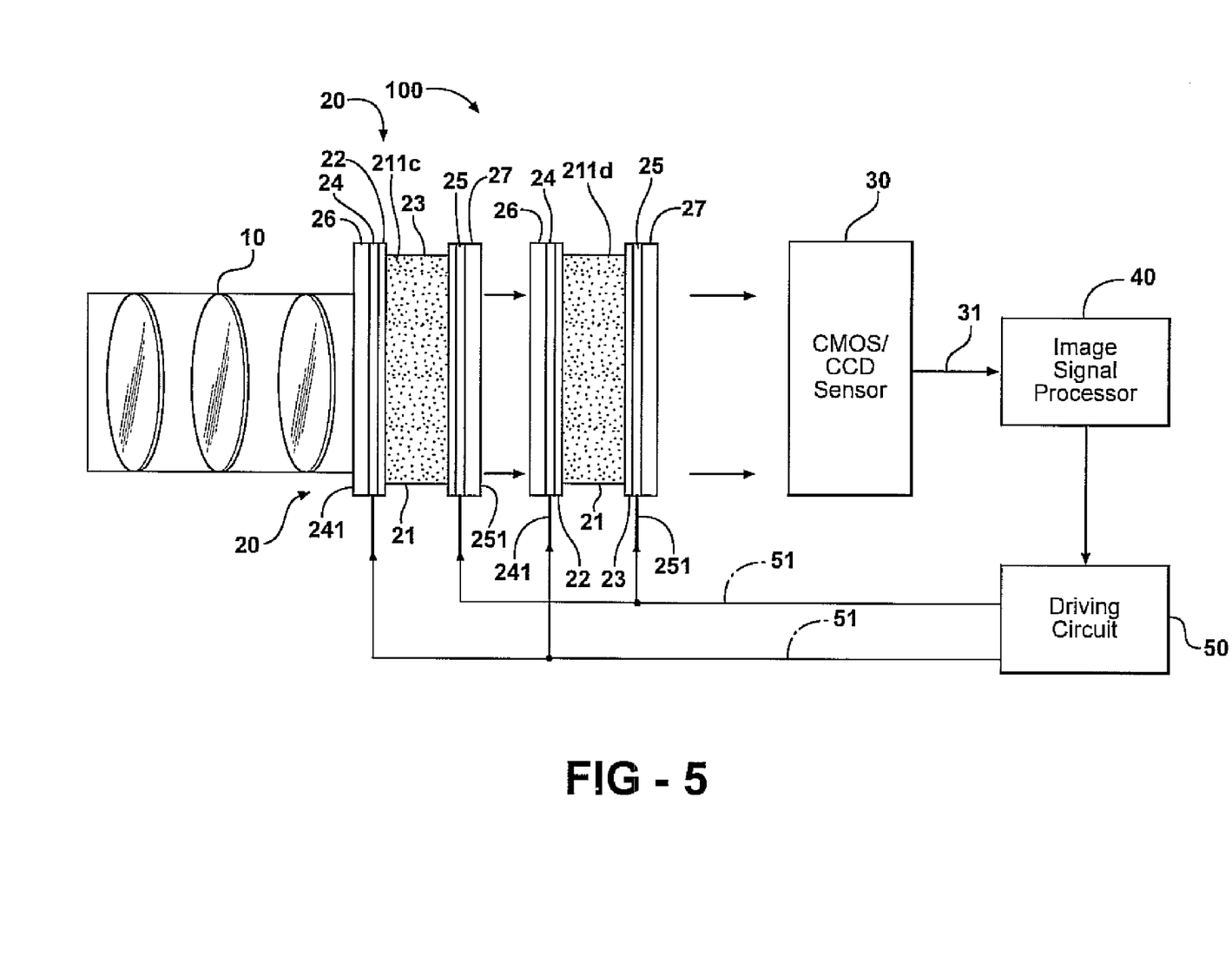
FIG. 5 is a schematic diagram of a system employing a pair of LC lenses feeding one another and operating upon the output of a multiple lens conventional lens array, with the refractive index of the liquid crystals controlled by the inventive system.
Figure 6:
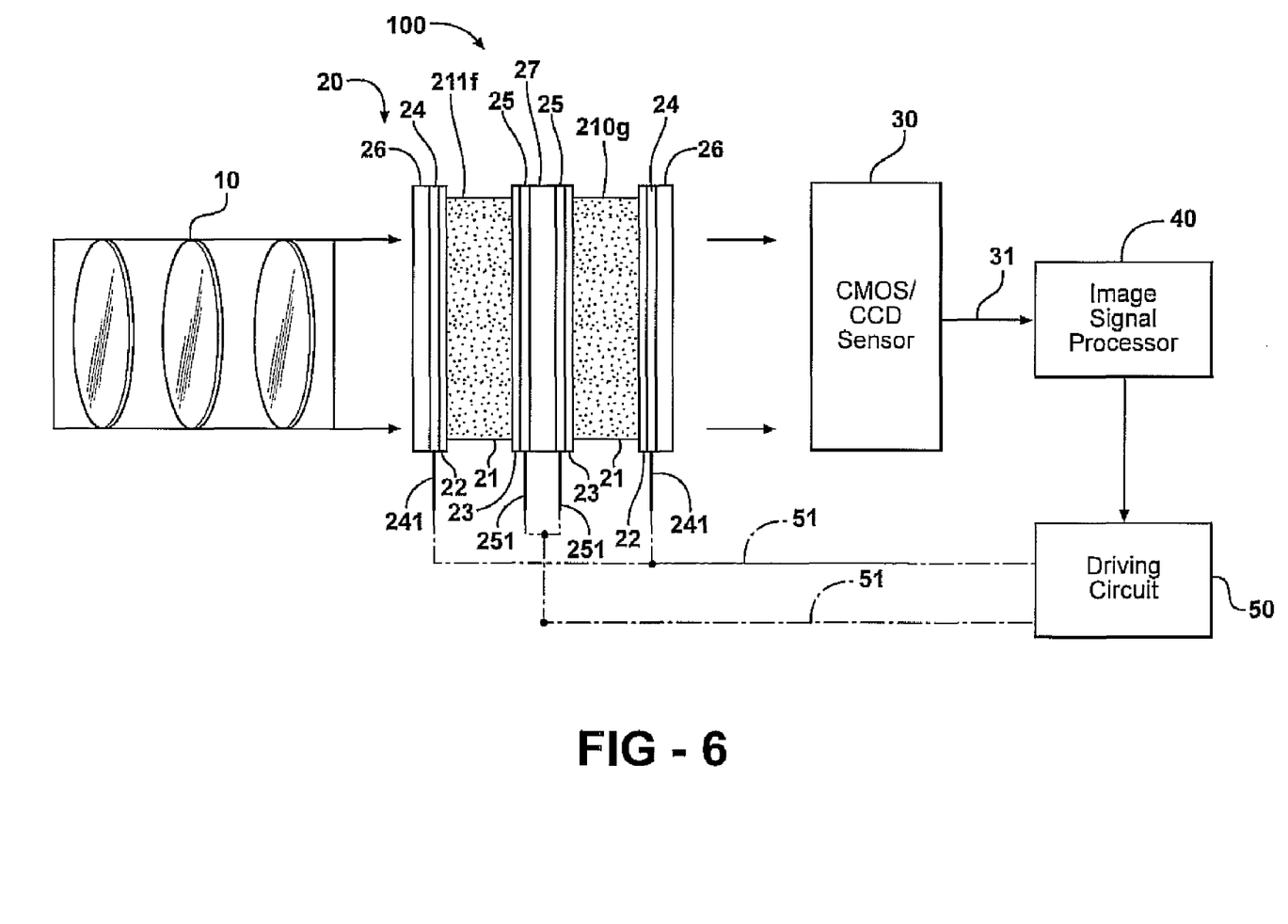
FIG. 6 is a schematic diagram of another variation of the invention employing two LC lenses mounted close to each other and operating upon the output of a conventional lens module.

FIG. 5 is similar but two LC modules 211c and 211d are mounted close to one another at the output of a conventional lens assembly. In the system of FIG. 6 the two modules 211f and 211g are attached together in series and receive the output of the conventional lens module before it is captured by the image sensor and processed to control the driving voltages on the two LCs.

Figure 8:
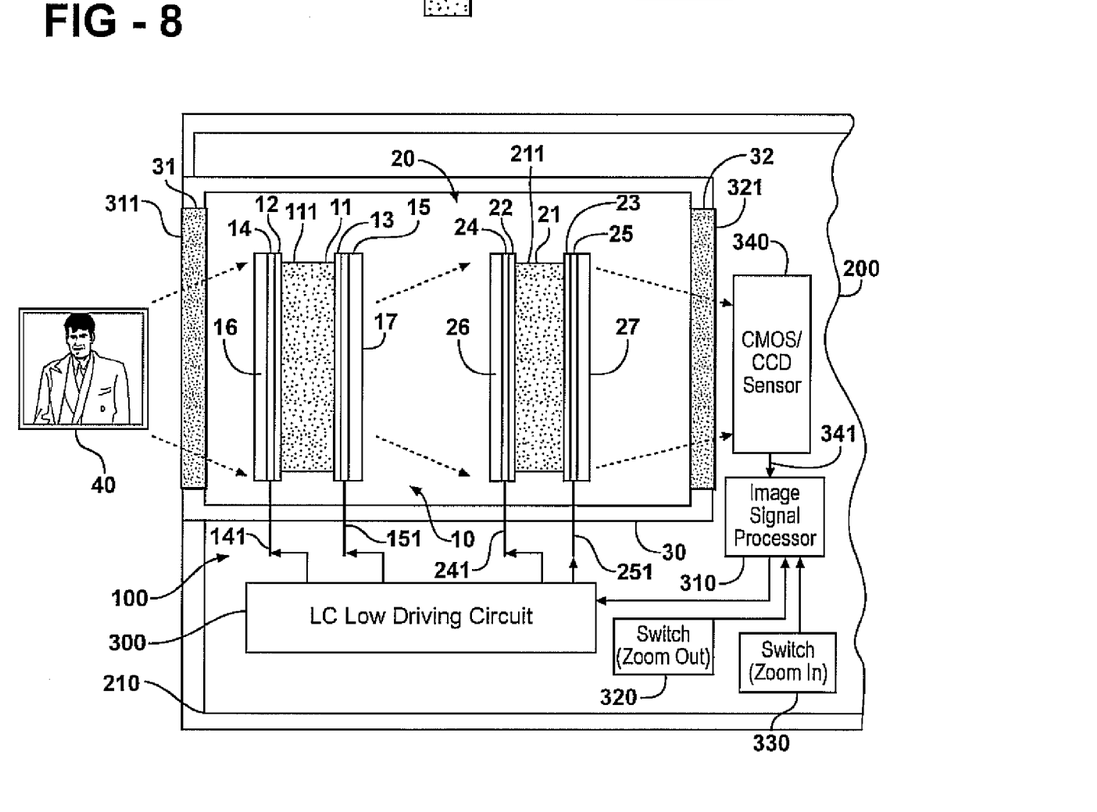
FIG. 8 is a schematic diagram illustrating an LC zoom lens system employing two lenses, one initially irradiated to form a negative lens and a second initially irradiated to form a positive lens, with a zoom control system formed in accordance with the present invention.

FIG. 8 illustrates an assembly consisting of an input conventional lens 311, an output conventional lens 321, and a pair of LC modules 10 and 20 arranged in series between the two. The LC module 10 may be pretreated to have the configuration of a double concave lens and the module 20 pretreated to have the contour of a double convex lens. Light from an image 40 passes through the input lens 311 to the LC 10 and advances to the LC 20 and out through the conventional lens 321. The resulting image falls in the image sensor 340 which feeds an image sensing processor 310. A pair of operator controlled switches 320 and 330 provide signals to the processor 310 representative of zoom in and zoom out. The ISP 310 provides a resulting output signal to the driver 300 for generating control voltages for the two LC units 10 and 20. By comparing the desired zoom with the actual zoom as determined by the image sensor 340, the image signal processor 310 repeatedly rapidly adjusts the driving voltages until the desired zoom is achieved.

Having thus described our invention, we claim:

1. A zoom lens control system comprising:
   at least one electronically tunable liquid crystal lens module comprising a liquid crystal lens, and a pair of ITO electrodes sandwiching opposed sides of said liquid crystal lens;
   at least one conventional optical element attached to at least one of said electronically tunable liquid crystal lens modules, said conventional optical element operable to receive light from a scene;
   a power supply for applying a controlled voltage across the two electrodes of said electronically tunable liquid crystal lens module so as to adjust the refractive index of said liquid crystal lens module;
   an operator control for generating a signal representative of a desired zoom level;
   an image sensor operative to receive light passing through said electronically tunable liquid crystal lens module and said conventional optical element to generate an output signal; and
   an image signal processor operative to receive the output signal from said image sensor and said desired zoom level signal and to adjust the voltage applied across the two electrodes of said electronically tunable liquid crystal lens module in order to achieve the inputted zoom level.

2. The zoom lens control system of claim 1 wherein said electronically tunable liquid crystal lens module comprises a polymer network liquid crystal.

3. The zoom lens control system of claim 1 wherein said electronically tunable liquid crystal lens module comprises a polymer network liquid crystal which has been irradiated by an ultraviolet light source through a gray mask to achieve a desired refractive index contour.

4. The zoom lens control system of claim 1 wherein said image signal processor iteratively adjusts the voltage applied across the two electrodes of said electronically tunable liquid crystal lens module until an image at the inputted zoom level is achieved.

5. The zoom lens control system of claim 1 wherein said electronically tunable liquid crystal lens module comprises a negative lens.

6. The zoom lens control system of claim 1 wherein said image sensor is a CMOS-based image sensor.

7. The zoom lens control system of claim 1 wherein said image sensor is a CCD image sensor.

8. The zoom lens control system of claim 1 wherein said electronically tunable liquid crystal lens module comprises a positive lens.

9. The zoom lens control system of claim 1 wherein said conventional optical element comprises a fixed refractive index lens operable to receive light from said scene and pass it to said liquid crystal lens.

10. A zoom lens control system for focusing on a subject, comprising:
    a pair of electronically tunable liquid crystal lenses, with transparent electrodes sandwiching opposed sides of each of said liquid crystal lenses;
    at least one conventional optical element disposed in contact with at least one of said electronically tunable liquid crystal lenses, the liquid crystal lenses and the conventional optical element being positionable so that light reflected from the subject passes through the lenses and the optical element;
    a power supply for applying controlled voltages across the electrodes of each of said electronically tunable liquid crystal lenses to adjust the refractive index and the powers of said liquid crystal lenses;
    an operator control for generating a signal representative of a desired zoom level;
    an image sensor operative to receive light reflected from the subject and passed through said electronically tunable liquid crystal lenses and said conventional optical element to generate an output signal; and
    an image signal processor operative to receive the output signal from said image sensor and said desired zoom level signal and to adjust the voltages applied across the electrodes of said electronically tunable liquid crystal lenses in order to achieve the inputted zoom level.

11. The zoom lens control system of claim 10 wherein each member of the pair of electronically tunable liquid crystal lenses has a polarization orthogonal to the polarization of the other lens of the pair.

12. The zoom lens control system of claim 10 wherein one of the pair of electronically tunable liquid crystal lenses has a negative optical power and the other lens of the pair has a positive optical power.

13. The zoom lens control system of claim 12 wherein the negative optical power of one member of the pair of electronically tunable liquid crystal lenses and the positive optical power of the other member of the pair of electronically tunable liquid crystal lenses is achieved by the controlled voltages applied to the electrodes of each member of the lens pair.

14. The zoom lens control system of claim 10 comprising a conventional optical element for receiving light reflected from the subject;
    the pair of electronically tunable liquid crystal lenses being arranged in series, to receive light from said input conventional optical element and pass out the light to an output conventional element which illuminates said image sensor.

15. The zoom lens control system of claim 14 wherein the image signal processor acts to iteratively adjust the voltages applied to the pair of liquid crystal lenses to achieve the inputted zoom level.

* * * * *